No. 763,315. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 1.

Fig. 1.

Witnesses
Geo. W. Young.
N. E. Oliphant

Inventor:
John M. Nash
By H. G. Underwood
Attorneys

No. 763,815. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 2.

Fig. 2.

Witnesses:
E. W. Young.
N. E. Oliphant

Inventor:
John M. Nash
By H. G. Underwood
Attorneys

No. 763,315. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 3.

No. 763,315. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 4.

Fig. 4.

Witnesses
Geo. W. Young.
N. E. Oliphant.

Inventor
John M. Nash
By H. G. Underwood
Attorneys

No. 763,315. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 7.

No. 763,315. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 8.

Fig. 8

Witnesses:
Geo. W. Young
N. E. Oliphant

Inventor
John M. Nash
By H. G. Underwood
Attorney

No. 763,315. PATENTED JUNE 21, 1904.
J. M. NASH.
MACHINE FOR REDUCING WOOD OR OTHER MATERIAL.
APPLICATION FILED AUG. 21, 1903.
NO MODEL. 9 SHEETS—SHEET 9.

Witnesses:
Geo. W. Truing.
H. E. Oliphant

Inventor:
John M. Nash
By H. G. Underwood
Attorneys

No. 763,315.

Patented June 21, 1904.

UNITED STATES PATENT OFFICE.

JOHN M. NASH, OF MILWAUKEE, WISCONSIN.

MACHINE FOR REDUCING WOOD OR OTHER MATERIAL.

SPECIFICATION forming part of Letters Patent No. 763,315, dated June 21, 1904.

Application filed August 21, 1903. Serial No. 170,291. (No model.)

*To all whom it may concern:*

Be it known that I, JOHN M. NASH, a citizen of the United States, and a resident of Milwaukee, in the county of Milwaukee and State of Wisconsin, have invented certain new and useful Improvements in Machines for Reducing Wood or other Material; and I do hereby declare that the following is a full, clear, and exact description thereof.
My invention consists in what is hereinafter particularly set forth with reference to the accompanying drawings and subsequently claimed, its object being economical rapid reduction of a succession of pieces of various material by abrasion or otherwise, the machine herein shown and specifically described being designed for smoothing round woodwork, especially such as has irregularity of configuration, provision being had for operating with abrading material in depressions and upon elevations of the work at a uniform pressure, so as not to mar its outline.

Fig. 5, a partly-sectional view of a portion of the machine, indicated by line 5 5 in the sixth figure.

Figure 1:
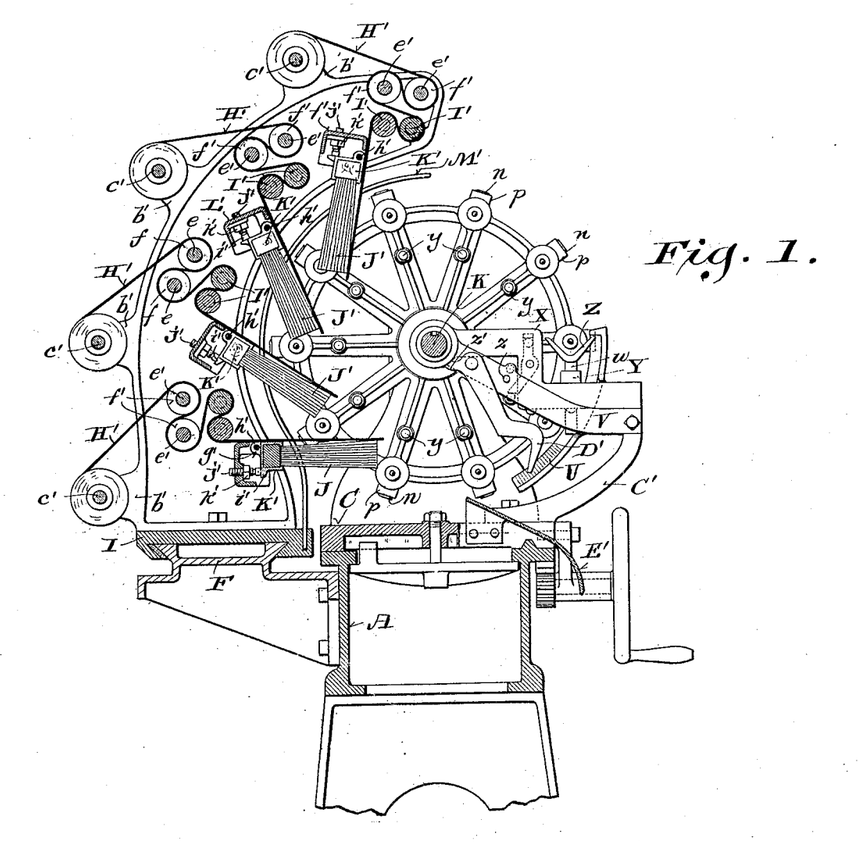
Figure 1 of the drawings represents a vertical transverse section of the machine and is indicated by line 1 1 in the third figure.
Figure 2:
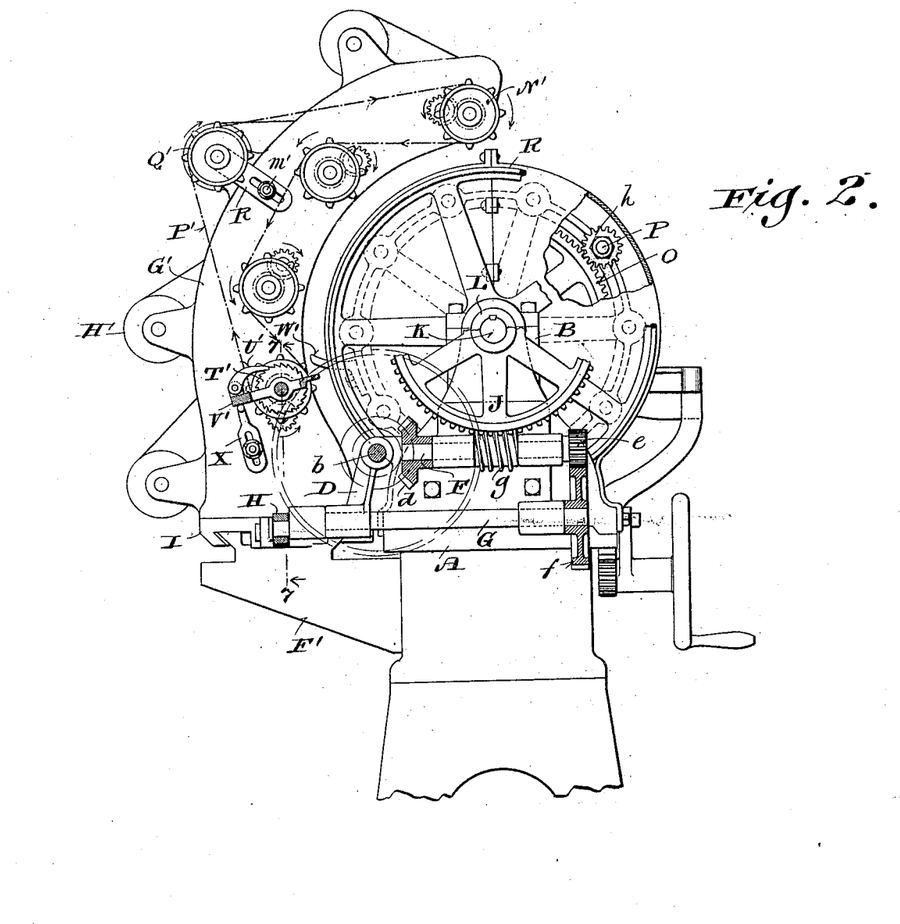
Fig. 2, an elevation of the drive end of the machine, parts being broken and in section.
Figure 3:
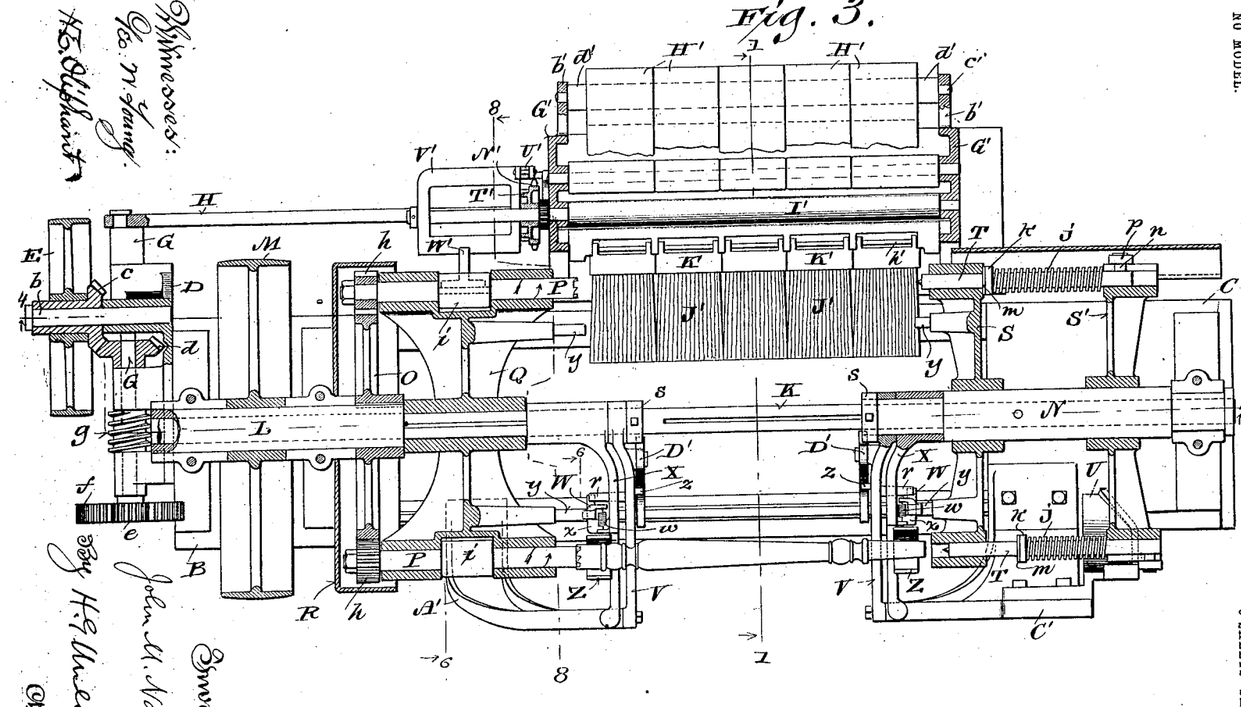
Fig. 3, a plan view of the machine, partly in horizontal section.
Figure 4:
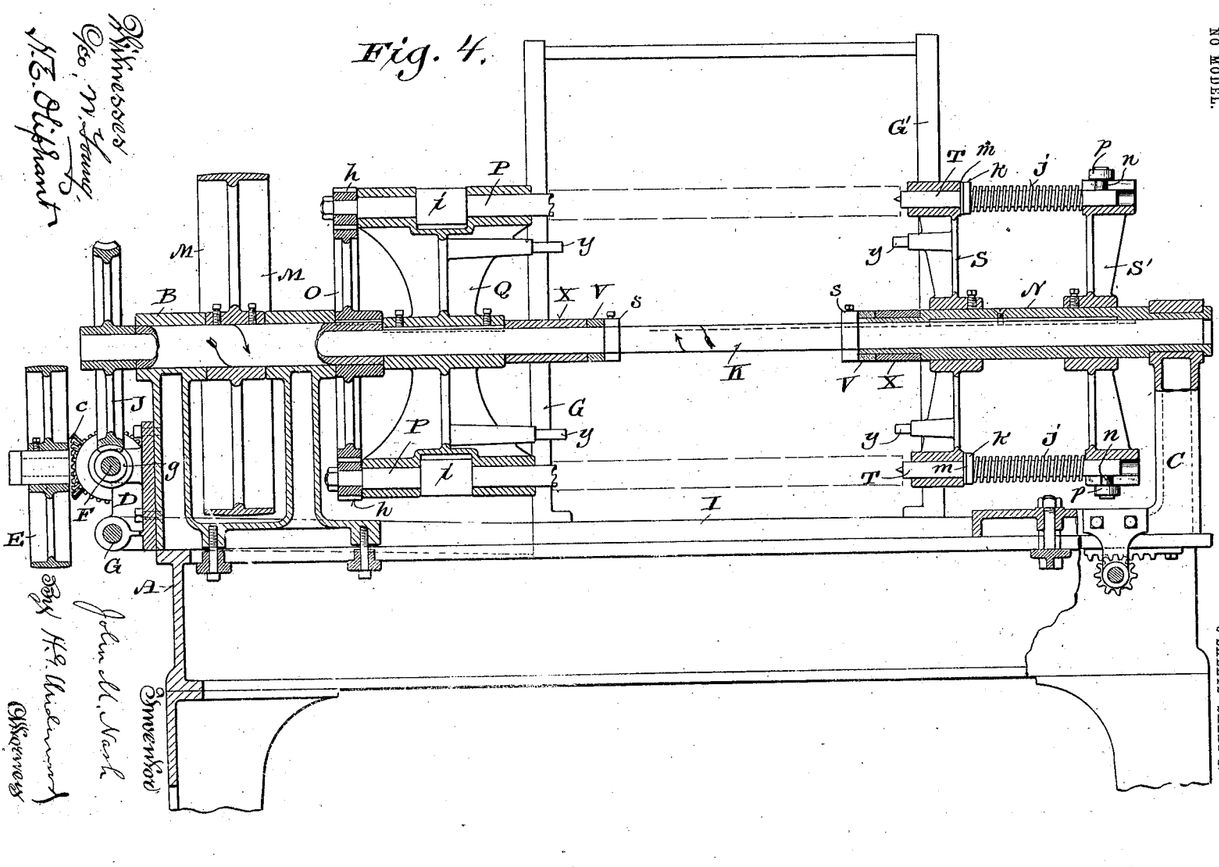
Fig. 4, a vertical longitudinal sectional view of the machine, indicated by line 4 4 in the third figure.
Figures 5, 13:
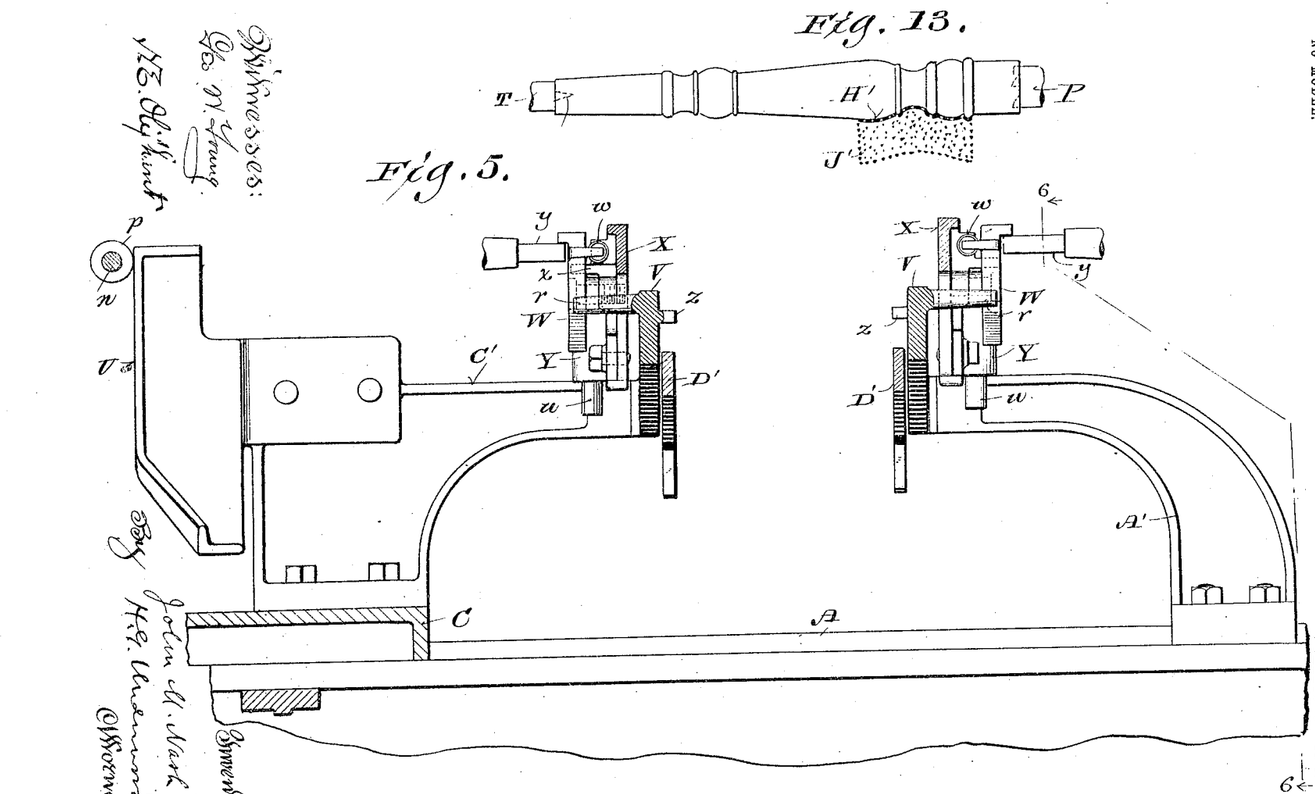
Figure 6:
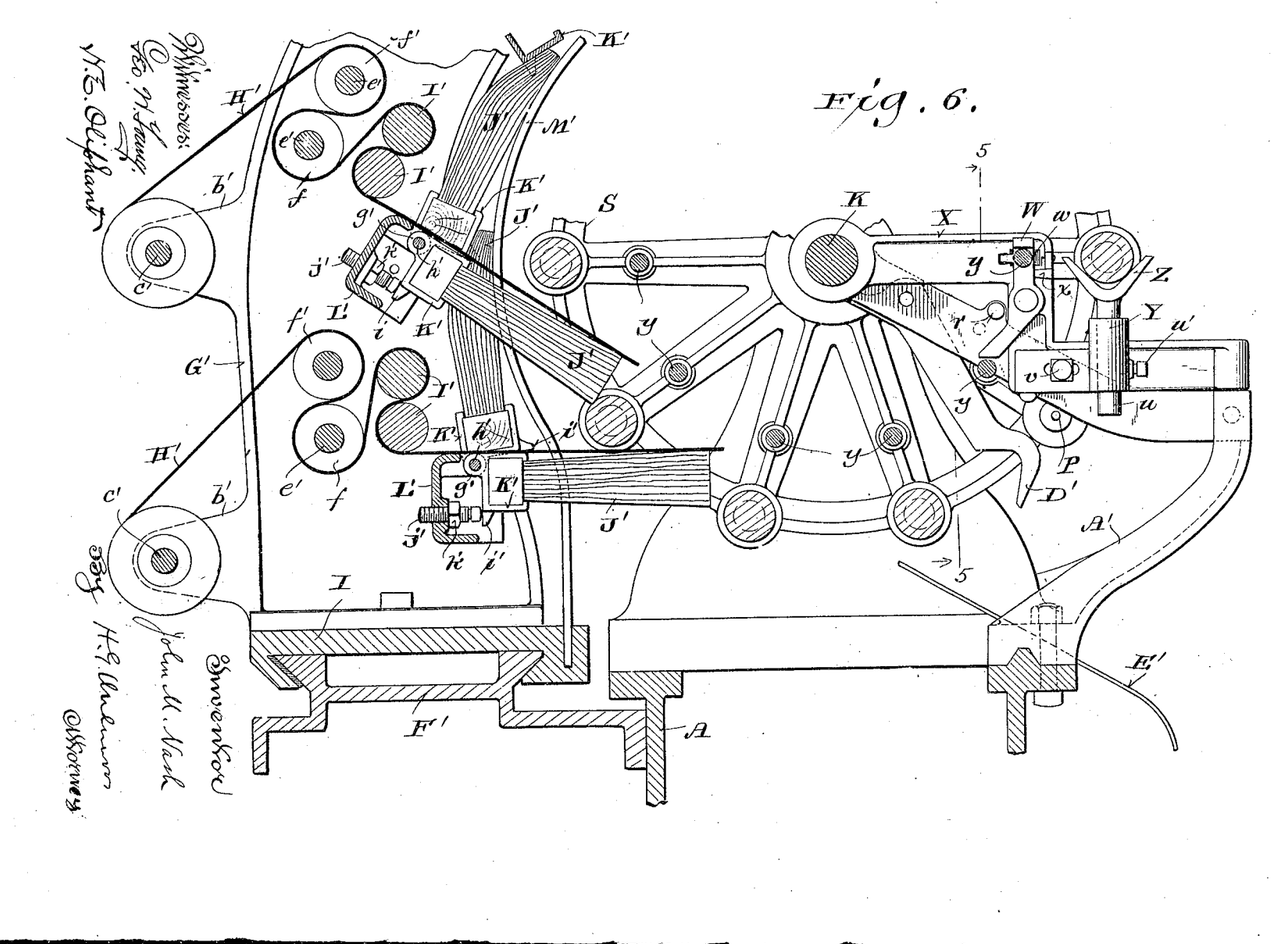
Fig. 6, a similar view indicated by line 6 6 in the third and fifth figures.
Figure 7:
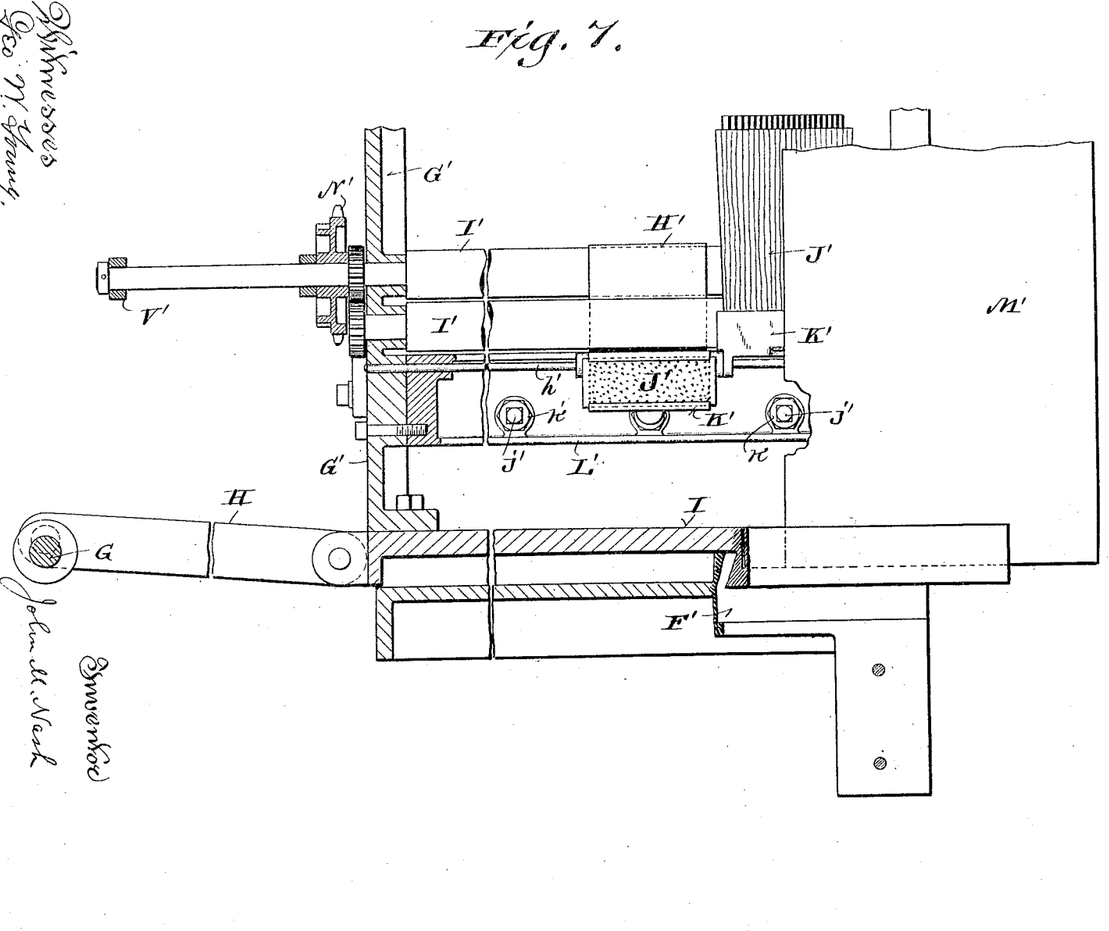
Fig. 7, an elevation, partly in section, of a rear portion of the machine.
Figure 8:
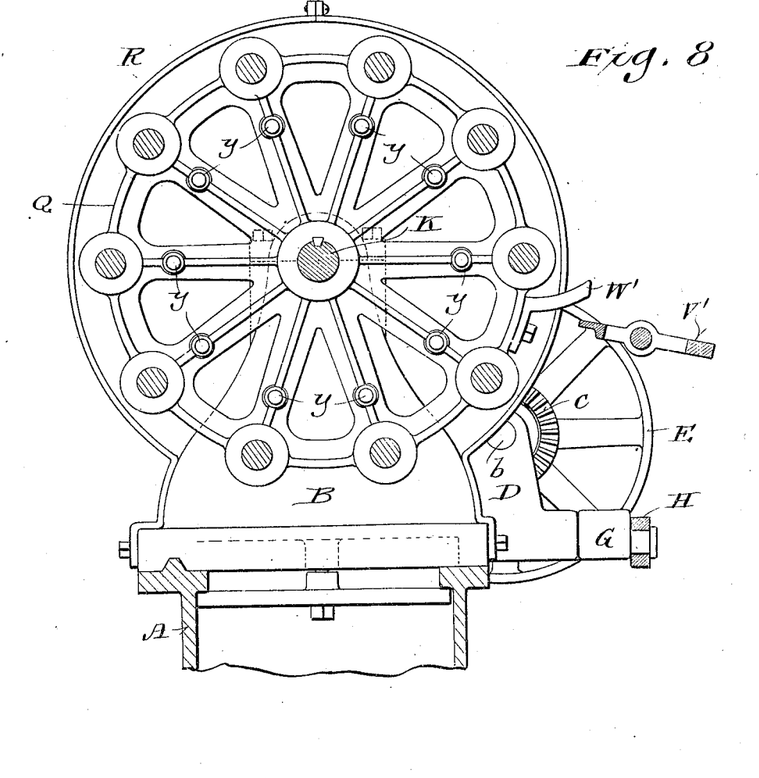
Fig. 8, a vertical transverse section of the machine, indicated by line 8 8 in the third figure.
Figure 9:
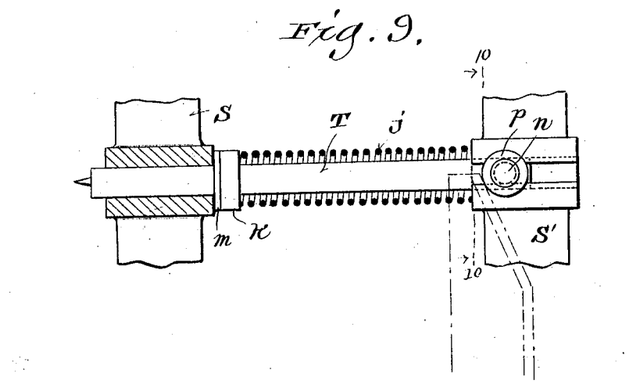
Fig. 9, a partly-sectional view illustrating a portion of a pair of rotatory circular holders in the machine and one of a series of intermittently-reciprocative spindles guided in the holders.
Figure 10:
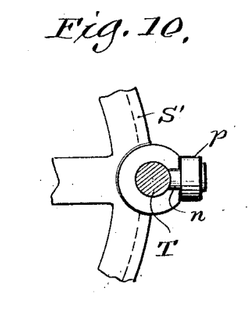
Fig. 10, a detail partly-sectional view indicated by line 10 10 in the ninth figure.
Figure 11:
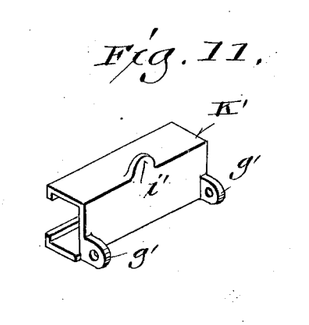
Fig. 11, a perspective view of one of the brush-holders in the machine.
Figure 12:
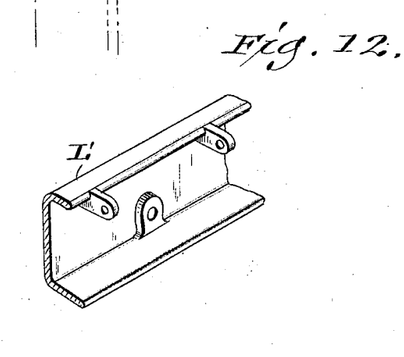
Fig. 12, a similar view of a portion of one of a plurality of channel-bars with which brush-holders are connected in series, and Fig. 13 a diagram illustrating a piece of irregularly-configured material in contact with a cushioned strip of flexible abrading material.

Referring by letter to the drawings, A indicates the bed of my machine, the same being supported on suitable legs. Clamped on the bed at one end of same is a head-stock B, and a tail-stock C is adjustable on the bed, longitudinally of the same, by means of rack-and-pinion gear, other means being provided for clamping the tail-stock in adjusted position. The detail of the bed, head-stock, tail-stock, the means for clamping said stocks on said bed and the mechanism for facilitating adjustment of the aforesaid tail-stock are immaterial to the carrying out of my invention. Hence these features of the machine are susceptible of indefinite variation.

Bolted or otherwise fastened to the lower outer end of the head-stock is a bracket D, and loose on a stud $b$, made fast in the bracket, is a bevel gear-wheel $c$, to the hub of which a driving-pulley E is rigidly secured. A worm-shaft F has its bearings in arms of the bracket D, and a bevel gear-wheel $d$, fast on said shaft, is meshed with the one, $c$, aforesaid. A spur-pinion $e$, fast on the worm-shaft, meshes with a spur-wheel $f$, that is fast on a countershaft G, that also has its bearings in arms of the bracket D and is in crank connection with a link-bar H, coupled to a slide I, that reciprocates on a guide-bracket, to which further reference is hereinafter made. The worm $g$ of the shaft F meshes with a worm-wheel J, that is fast on a main shaft K, arranged to turn in a sleeve L, loose in the head-stock B, and a driving-pulley M is fast on said sleeve. In spline connection with the shaft K is another sleeve, N, for which the tail-stock C is provided with a bearing.

Keyed on the sleeve L is a spur-wheel O, in mesh with pinions $h$, fast on live-spindles P, that have their bearings at regular intervals of a circle in a head Q, that is fast on the shaft K and concentric with the same. A housing R is preferably employed in connection with the head-stock to cover the spur-gear connecting the sleeve L and live-spindles.

The head or carrier Q is provided with a peripheral depression engaged by collars $i$ of the spindles P, the fit of the collars in said depression being such as to prevent longitudinal play of said spindles in their bearings.

A pair of circular holders S S' are spaced apart and made fast on the sleeve N, that is splined on the shaft K to be adjustable with the tail-stock C, and said holders are provided with guides for dead-spindles T, alined with the ones, P, aforesaid. The sleeve N and holders S S' are hereinafter collectively designated as a "carrier." A spiral spring $j$ of suitable power is arranged on each of the spindles T, between a collar $k$ of same and the holder S', buffing-washers $m$ of suitable material being preferably employed between the holder S and the spindle-collars to prevent noise that would otherwise result in the operation of the machine. Extending from each of the spindles T, at a right angle to the same, is a stud $n$, engaging a longitudinal slot in the spindle-bearing with which the holder S' is provided, and an antifriction-roller $p$ is carried by the stud outside of said bearing, said stud and roller being collectively a wiper.

Front brackets A' C' are respectively bolted to the bed A and tail-stock C, and likewise connected to the bracket C' is the shank of a cam U in the path of the antifriction-rollers $p$, that are carried by the studs $n$ of the dead-spindles T, above specified.

Engaged by the shaft K and sleeve N, respectively, are two bars V V, bolted to the brackets A' and C', respectively, and each provided with an outwardly-extending lug $r$, arranged to be in the path of the depending offset end of an otherwise vertical dog W, pivotally connected to a double right-angle arm X, the arms being loose on said shaft and sleeve, respectively. The bars V V and arms X X are held in proper position by means of set-collars $s$ on the shaft K, and bolted to each arm is the longitudinally-slotted horizontal shank of a vertical sleeve Y, in which the tang $u$ of a work-supporting fork Z is adjustably held with respect to normal elevation by means of a set-screw $u'$, and as the set-bolt $v$ for the sleeve-shank engages the slot in said shank the fork aforesaid is capable of horizontal as well as vertical adjustment for the purpose of properly centering work fed to the machine. An upper lug of each of the dogs W is connected by a spiral spring $w$ to a lug of the adjacent arm X, and said dog is normally held by said spring in contact with a stop-lug $x$ of said arm. The overhanging upper ends of the dogs W are in the paths of fingers $y$, with which the head Q and holder S are provided, each of the fingers being parallel to one of the spindles.

Shown in pivotal connection with the bars V are hook-like buffers D' for work that is automatically released from live and dead spindles, and an apron E' in connection with the tail-stock is arranged to guide the work deflected by the buffers clear of the machine. Outward play of the buffers is limited by stop-lugs $z$, projecting laterally from the arms V, and inward swing of said buffers is limited by contact of lugs $z'$ of same with collars on the main shaft.

The guide-bracket F' for the reciprocative slide I is bolted to the rear of the bed A, and a pair of parallel-curved standards G' are bolted on said slide. Supported in rear ears $b'$ of the standards are rods $c'$, each of which serves as an arbor for a series of spools of flexible abrading material H', such as sandpaper or its equivalent, the same for some work being preferably of the species disclosed in my Patent No. 725,761, of April 21, 1903, and said spools are held against other than rotatory movement by spacers $d'$ on said rods adjacent to said standards. Other rods, $e'$, in pairs are supported in the standards G' and serve as arbors for loose rollers $f'$, on which the strips of abrading material from the spools are trained, these rollers being employed in the arrangement shown to obtain a friction on said abrading material.

Journaled in the standards G' are pairs of feed-rolls I', adjacent to the friction-rollers $f'$, arranged in series of pairs on the rods $e'$, and the strips of abrading material are trained on said feed-rolls, the free ends of said strips being backed by brushes J' of suitable material. The brush-heads are blocks having sliding fit in angular inwardly-flanged holders K', that are provided with apertured ears $g'$, engaged by pivot-rods $h'$, supported in channel-bars L', that are bolted at their ends to the aforesaid standards. The pivot-rods for the brush-holders are at intervals of a circle concentric with the shaft K, and an ear $i'$ of each brush-holder is opposed by an adjustable stop in the form of a set-screw $j''$, that engages the adjacent channel-bar, a set-nut $k'$ being preferably employed on said screw. By means of the adjustable stops the holders K' can be independently set to regulate the angle of the corresponding brushes and strips of abrading material arranged in the path of successive pieces of work that are centered in the machine to be traveled on a circle simultaneous with revolution at high speed on their own axes. It is intended that the abrading material shall be of different degrees of fineness in descending order, the coarsest being first and the finest last in the path of each piece of the aforesaid work.

A shield M' is shown adjustable in a longitudinal groove of the slide I to hold brushes and strips of abrading material swung up out of working position, the major portion of the shield being concentric with the shaft K of the machine. When brushes and abrading material are swung up back of the shield M', the feed mechanism hereinafter described is not effective on said strips.

Journals of each pair of feed-rolls I' are in spur-gear connection, and fast on one of said journals is a sprocket-wheel N' for a link belt P', that is also engaged by another sprocket-wheel, Q', loose on a stud of a slotted bracket R', held in adjusted position on one of the standards G' by means of a set-bolt $m'$ to regulate tension of said belt. The roll-journal, carrying one of the sprocket-wheels N', is also provided with a ratchet-wheel T', fast thereon and which may be an integral part of said ratchet-wheel, as is herein shown. Engaging the ratchet-wheel T' is a pawl U' in pivotal connection with a rocker V', that is loose on the roll-journal that carries said ratchet-wheel, and this rocker is in the path of a striker W', bolted to the rotatory head Q of the machine. The set of the rocker with reference to varying the throw of the pawl therewith is determined by adjustment of a longitudinally-slotted supporting-stop X', held on one of the standards G' by a set-bolt engaging its slot.

The machine having been properly adjusted, the pieces of work to be operated upon are laid one after another in the forks Z, that are intermittently lifted on arcs of circles having the same radius and line of center as those on which the spindles P T are spaced, the lifting speed of said forks being the same as the rotatory speed of the shaft K, on which the arms X are centered. The lifting operation is due to contact of alined fingers $y$ of the head Q and holder S, with overhanging ends of the dogs W pivoted to said arms, and by subsequent contact of said dogs with lugs $r$ of the stationary arms V they are tripped to clear said fingers, the result being an automatic return of the work supports or forks Z to normal position. In the meantime the antifriction-roller $p$, carried by a previously-retracted spring-controlled dead-spindle T, clears the retracting-cam U, and as a result of this operation there is automatic accurate centering of the work supported by the then lifting forks aforesaid, it being understood that the lifting of the successive pieces of work fed to the machine compensates for variations in the time of release of the spring-controlled dead-spindles T one after another from retracted position. Each piece of work, rotating on its axis at high speed, is traveled by the rotatory spindle-carriers to have contact with the flexible abrading material arranged in series of strips at different elevations against yielding backing, and said work is subsequently released by an automatic retraction of its spring-controlled dead-spindle, due to the cam U in the path of the antifriction-roller carried by said spindle. The slide I being reciprocative, all of the abrading material is vibrated on the work to which it is opposed. From the foregoing it will be understood that there is uniformity of pressure of the work on all the abrading material in its path, and on the release of said work tangent flight of the same is checked by the yielding buffers D', that deflect it onto the apron E', from which it discharges clear of the machine. At each revolution of the head Q the striker W' therewith operates the rocker V', the result being a throw of the pawl U' to actuate the ratchet-wheel T' and impart motion to the link belt and sprocket-gear, the result being a predetermined amount of feed of the abrading material from its spools. By employing other strikers on the head Q at suitable intervals apart the feed of the abrading material may be more frequent.

While the machine herein shown and described is organized for the reduction of a succession of pieces of woodwork by abrasion, it is within the scope of my invention to substitute other reducers for the abrading material and to employ said machine for reducing material other than wood.

Having thus described my invention, what I claim as new, and desire to secure by Letters Patent, is—

1. A machine comprising means for centering a succession of pieces of material and traveling the same on a circle simultaneous with rotation of each piece on its own axis, reducers arranged in the path of the material, means for releasing each piece of the reduced material, and deflecting-buffers opposed to tangent flight of said reduced material when released.

2. A machine comprising means for centering a succession of pieces of material and traveling the same on a circle simultaneous with rotation of each piece on its own axis, reducers arranged in the path of the material, means for releasing the reduced material, and yielding buffers opposed to tangent flight of said reduced material when released.

3. A machine comprising means for centering a succession of pieces of material and traveling the same on a circle simultaneous with a rotation of each piece on its own axis, vibratory reducers arranged in the path of the material, and means for releasing the reduced material.

4. A machine comprising means for centering a succession of pieces of material and traveling the same on a circle simultaneous with a rotation of each piece on its own axis, work-supports having intermittent lift coincident with centering operations, reducers arranged in the path of the material, and means for releasing each piece of the reduced material.

5. A machine comprising rotatory carriers, intermittently-lifting work-supports having the same axis as the carriers, means for centering successive pieces of work in connection with said carriers coincident with lifting operations of said supports, means for rotating each piece of work on its own axis, reducers arranged in the path of the work, and means for releasing each piece of reduced work subsequent to a reducing operation thereon.

6. A machine comprising means for centering a succession of pieces of work and traveling the same on a circle simultaneous with a rotation of each piece on its own axis, flexible abrading material arranged in the path of the work, yielding backing for the abrading material, and means for releasing each piece of the work.

7. A machine comprising means for centering a succession of pieces of work and traveling the same on a circle simultaneous with a rotation of each piece on its own axis, flexible abrading material arranged in the path of the work, yielding backing for the abrading material, means for feeding said abrading material and means for releasing each piece of the work subsequent to an abrading operation thereon.

8. A machine comprising means for centering a succession of pieces of work and traveling the same on a circle simultaneous with a rotation of each piece on its own axis, a vibrating carrier, abrading material with the carrier in the path of the work, yielding backing for the abrading material, and means for releasing each piece of the work subsequent to an abrading operation thereon.

9. A machine comprising means for centering a succession of pieces of work and traveling the same on a circle simultaneous with a rotation of each piece on its own axis, flexible abrading material having automatic intermittent feed and arranged to be in the path of the work, yielding backing for the abrading material, and means for releasing each piece of the work subsequent to an abrading operation thereon.

10. A machine comprising means for centering a succession of pieces of work and traveling the same on a circle simultaneous with a rotation of each piece on its own axis, flexible abrading material arranged to be in the path of said work at different elevations, yielding backing for the abrading material, and means for releasing each piece of the work subsequent to an abrading operation thereon.

11. A machine comprising means for centering a succession of pieces of work and traveling the same on a circle simultaneous with a rotation of each piece on its own axis, flexible abrading material arranged in the path of the work, pivotally-hung brushes constituting backing for the abrading material, means for holding strips of the abrading material and their backing-brushes out of working position, and means for releasing each piece of the work subsequent to an abrading operation thereon.

12. A machine comprising means for centering a succession of pieces of work and traveling the same on a circle simultaneous with a rotation of each piece on its own axis, flexible abrading material having feed from spools for which a vibratory carrier is provided, said material being in the path of the work, yielding backing for the abrading material, and means for releasing each piece of the work subsequent to an abrading operation thereon.

13. A machine comprising means for centering a succession of pieces of work and traveling the same on a circle simultaneous with a rotation of each piece on its own axis, flexible abrading material supported at different elevations, friction-rollers and feed-rolls on which the material is trained to be in the path of the work, brushes supported back of the free ends of the abrading material, mechanism for imparting motion to the feed-rolls, and means for releasing each piece of work subsequent to an abrading operation thereon.

14. A machine comprising means for centering a succession of pieces of work and traveling the same on a circle simultaneous with a rotation of each piece on its own axis, a reciprocative carrier, flexible abrading material supported by the carrier at different elevations, friction-rollers and feed-rolls on which the abrading material is trained to be in the path of the work, brushes supported back of the free ends of the abrading material, mechanism for imparting rotary motion to the feed-rolls, and means for releasing each piece of the work subsequent to an abrading operation thereon.

15. A machine comprising means for centering a succession of pieces of work and traveling the same on a circle simultaneous with a rotation of each piece on its own axis, a reciprocative slide, standards supported on the slide, channel-bars connecting the standards at different elevations, flexible abrading material supported between the standards at elevations corresponding to that of the channel-bars, friction-rollers and feed-rolls on which the abrading material is trained to be in the path of the work, brushes in pivotally-adjustable connection with each channel-bar back of the free ends of adjacent abrading material, mechanism for imparting rotary motion to the feed-rolls, and means for releasing each piece of the work subsequent to an abrading operation thereon.

16. A machine comprising means for centering a succession of pieces of work and traveling the same on a circle simultaneous with a rotation of each piece on its own axis, a bracket extending from the machine-bed, a reciprocative carrier guided on the brackets, flexible abrading material supported by the carrier at different elevations, friction-rollers and feed-rolls on which the abrading material is trained to be in the path of the work, brushes supported back of the free ends of the abrading material, mechanism for imparting rotary motion to the feed-rolls, and means for releasing each piece of the work, subsequent to an abrading operation thereon.

17. A machine comprising a bed, head-stock and tail-stock; sleeves having their bearings in the head and tail stocks, a shaft loose in the head-stock sleeve but having the tail-stock sleeve rotative therewith, means for imparting independent rotatory motion to the shaft and head-stock sleeve, spindle-carriers fast on the shaft and tail-stock sleeve, planet-gear connecting the head-stock sleeve and spindles in the carrier on the shaft, these spindles being stationary in a longitudinal direction and the spindles in the opposite carrier alined therewith longitudinally movable against spring resistance, means for automatic temporary retraction of the longitudinally-movable spindles in successive order, supports for work to be centered between spindles, and reducers arranged in the path of the work.

18. A machine comprising a bed, head-stock and tail-stock; sleeves having their bearings in the head and tail stocks, a shaft loose in the head-stock sleeve but having the tail-stock sleeve rotative therewith, means for imparting independent rotatory motion to the shaft and head-stock sleeve, spindle-carriers fast on the shaft and tail-stock sleeve, planet-gear connecting the head-stock sleeve and spindles in the carrier on the shaft, these spindles being stationary in a longitudinal direction and the spindles in the opposite carrier alined therewith longitudinally movable against spring resistance, means for automatic temporary retraction of the longitudinally-movable spindles in successive order, supports for work to be centered between spindles, and vibratory reducers arranged in the path of the work.

19. A machine comprising a bed, head-stock, and tail-stock; sleeves having their bearings in the head and tail stocks, a main shaft loose in the head-stock sleeve but having the tail-stock sleeve rotative therewith, an independently-driven shaft in worm-gear with the main shaft, a driving-pulley fast on the head-stock sleeve, spindle-carriers fast on the main shaft and tail-stock sleeve, planet-gear connecting the head-stock sleeve and spindles in the carrier on the main shaft, these spindles being stationary in a longitudinal direction and the opposite spindles alined therewith longitudinally movable against spring resistance, means for automatic temporary retraction of the longitudinally-movable spindles in successive order, supports for the work to be centered between spindles, and reducers in the path of the work.

20. A machine comprising a bed, head-stock and tail-stock; sleeves having their bearings in the head and tail stocks, a main shaft loose in the head-stock sleeve but having the tail-stock sleeve rotative therewith, an independently-driven shaft in worm-gear with the main shaft, a counter-shaft spur-geared to the worm-shaft, planet-gear connecting the head-stock sleeve and spindles in the carrier on the main shaft, these spindles being stationary in a longitudinal direction and the spindles in the opposite carrier alined therewith longitudinally movable against spring resistance, means for automatic temporary retraction of the longitudinally-movable spindles in successive order, supports for work to be centered between spindles, a carrier having reciprocative connection with the counter-shaft, and reducers in connection with the reciprocative carrier in the path of the work.

21. A machine comprising opposite rotatory carriers, live and dead spindles in the carriers, the dead-spindles being spring-controlled and automatically retractive for a time in successive order, automatically-lifting supports for work to be centered between live and dead spindles, and reducers arranged in the path of the work.

22. A machine comprising opposite rotatory carriers, live and dead spindles in the carriers, the dead-spindles being spring-controlled and automatically retractive for a time in successive order, lifting-arms provided with spring-controlled pivotal dogs, fingers on the carriers parallel to the spindles therewith and arranged to have contact with the dogs, stationary dog-trippers, work-supports in connection with the arms, and reducers arranged in the path of the work centered between live and dead spindles.

23. A machine comprising means for centering and revolving work on its own axis, abrading material, a yielding backing for the same, and means whereby vibratory contact is had between the revolving work and abrading material.

24. A machine comprising means for centering and revolving work on its own axis, a vibratory carrier, abrading material with the carrier opposing the revolving work to have contact therewith, and a yielding backing for the abrading material.

In testimony that I claim the foregoing have hereunto set my hand, at Milwaukee, in the county of Milwaukee and State of Wisconsin, in the presence of two witnesses.

JOHN M. NASH.

Witnesses:
N. E. OLIPHANT,
E. W. HELLER.